Nov. 29, 1949 L. DINESEN 2,489,563
PULSATOR FOR MILKING MACHINES
Filed July 26, 1946 4 Sheets-Sheet 1

Inventor
Laurits Dinesen
By his Attorneys
Merchant & Merchant

Nov. 29, 1949     L. DINESEN     2,489,563
PULSATOR FOR MILKING MACHINES
Filed July 26, 1946     4 Sheets-Sheet 2
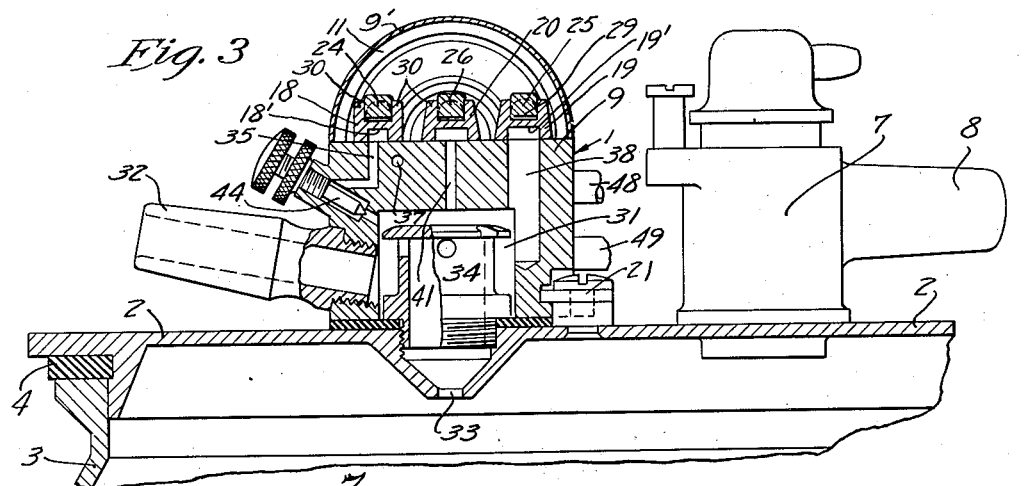
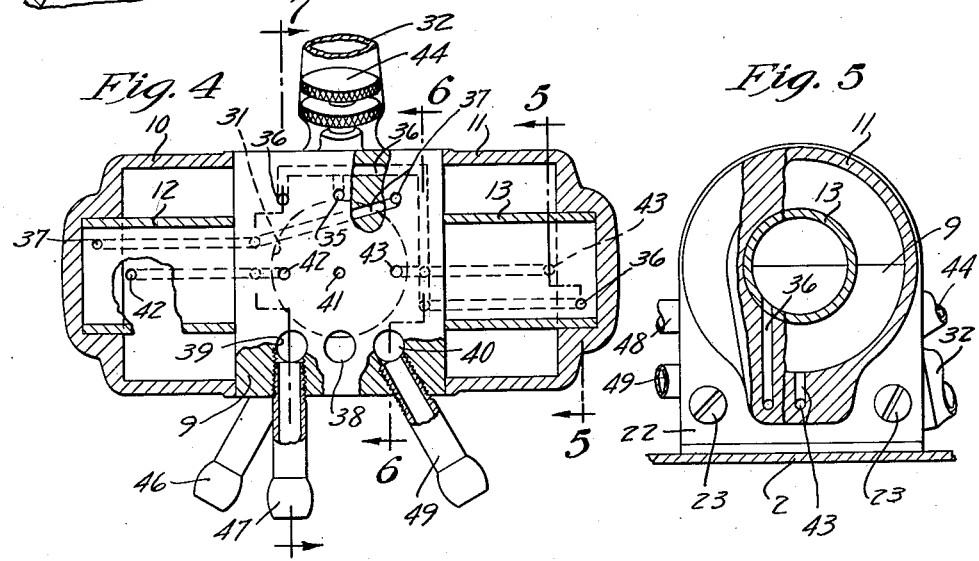
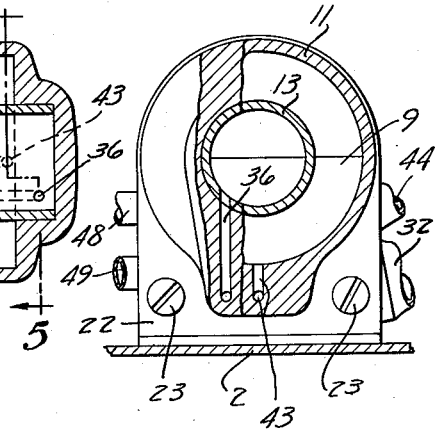
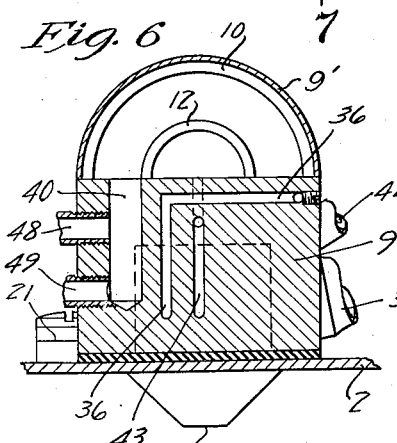
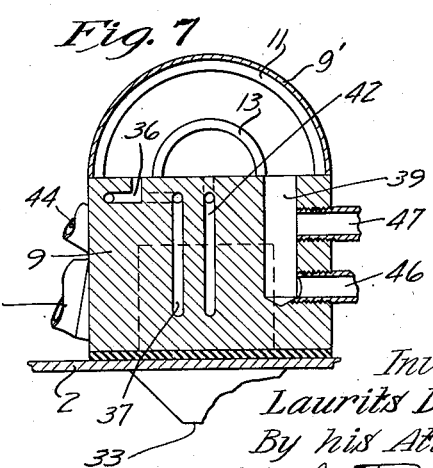
*Inventor*
*Laurits Dinesen*
By his Attorneys
Merchant & Merchant Nov. 29, 1949     L. DINESEN     2,489,563
PULSATOR FOR MILKING MACHINES
Filed July 26, 1946     4 Sheets-Sheet 3
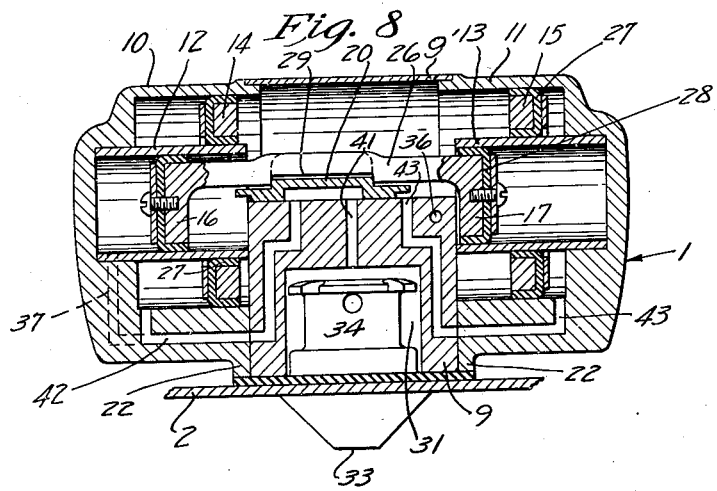
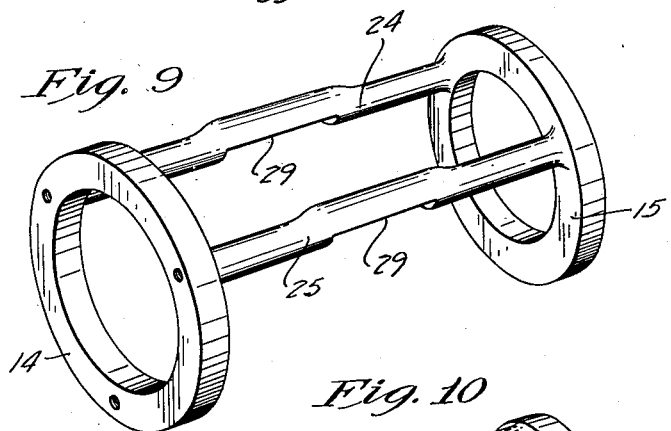
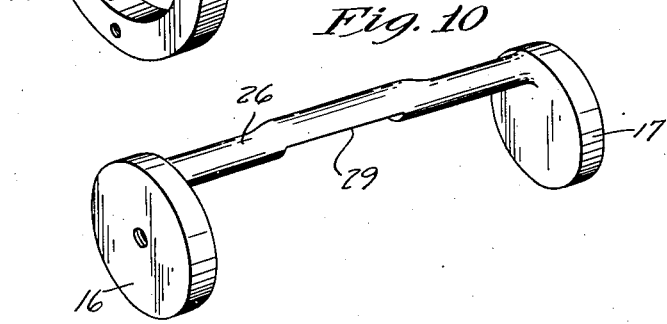
Inventor
Laurits Dinesen
By his Attorneys
Merchant & Merchant Nov. 29, 1949 L. DINESEN 2,489,563
PULSATOR FOR MILKING MACHINES
Filed July 26, 1946 4 Sheets-Sheet 4
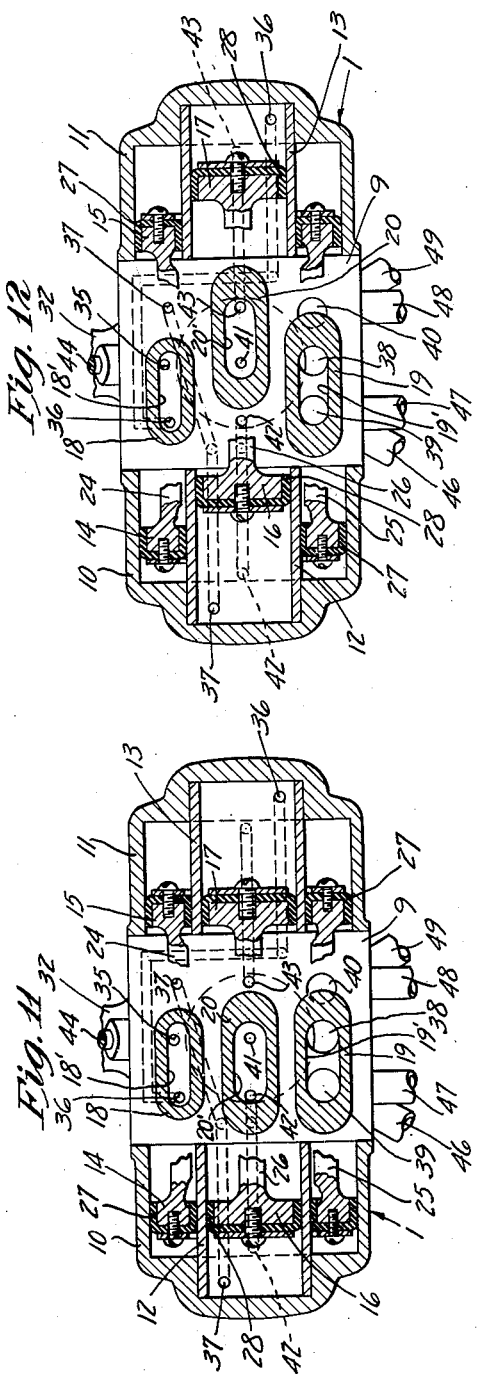
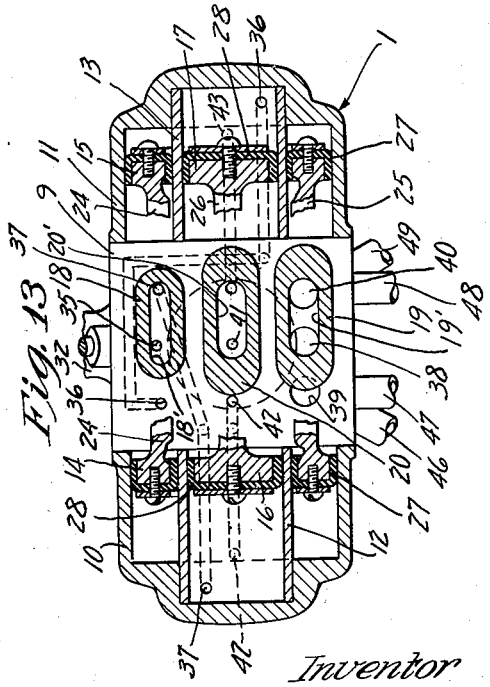
Inventor
Laurits Dinesen
By his Attorneys
Merchant & Merchant Patented Nov. 29, 1949

2,489,563

UNITED STATES PATENT OFFICE 2,489,563

PULSATOR FOR MILKING MACHINES

Laurits Dinesen, Minneapolis, Minn., assignor to Perfection Manufacturing Corporation, Minneapolis, Minn., a corporation of Minnesota Application July 26, 1946, Serial No. 686,329

9 Claims. (Cl. 31—62)

My present invention relates to improvements in pulsator mechanisms for milking machines, and more particularly to improvements in that type of pulsator mechanism involving two pairs of cylinders and cooperating pistons. In this type of pulsator, the pistons are air pressure operated and each pair of pistons operates valve mechanism controlling the other air of pistons, and the valve mechanism operated by one pair of pistons also serves as the pulsating valve mechanism for alternately connecting the teat cups of the associating milking apparatus with a source of partial vacuum and atmospheric pressure.

Heretofore it has been the accepted practice to arrange opposite pairs of cooperating piston-equipped cylinders in laterally-spaced or side-by-side relationship with the valve mechanism operated by each pair of piston located between opposed pistons of that particular pair thereof, ports controlled by valve mechanism operated by one pair of pistons being connected to the opposite pair of cylinders usually through passages drilled in a body located between opposite cylinders of each pair thereof.

In accordance with the present invention, I depart from the heretofore accepted practice of arranging the opposite pairs of cooperating piston-equipped cylinders in laterally-spaced or side-by-side relationship by providing an improved structure wherein cooperating pairs of piston-equipped cylinders are concentrically arranged one within the other thereof. This improved design results in an extremely compact unit involving a minimum of parts and production operations, thereby reducing the over-all costs of manufacture and providing a unit of small over-all dimensions having improved eye appeal.

The above and other highly important objects and advantages of the invention will be made apparent from the following specification, claims and appended drawings.

In the accompanying drawings, like characters indicate like parts throughout the several views.

Referring to the drawings:

Fig. 3 is a transverse sectional view, on a somewhat enlarged scale, taken on the line 3—3 of Fig. 1;

Fig. 4 is a sectional view on an enlarged scale taken on the line 4—4 of Fig. 2, and having some parts removed;

Fig. 5 is a detailed sectional view taken on the irregular line 5—5 of Fig. 4;

Fig. 6 is a sectional detailed view taken on the irregular line 6—6 of Fig. 4;

Fig. 7 is a detailed sectional view taken on the line 7—7 of Fig. 4, with some parts broken away;

Fig. 8 is a longitudinal sectional view on an enlarged scale taken on the line 8—8 of Fig. 1;

Fig. 9 is a perspective view of the annular outer pair of pistons and connecting members;

Fig. 10 is a perspective view of the inner pair of pistons and connecting member; and Figs. 11, 12, 13 and 14 are sectional views similar to Fig. 4, but taken on the line X—X of Fig. 2, and showing four different positions of the pistons and cooperating valves.

Figure 1:
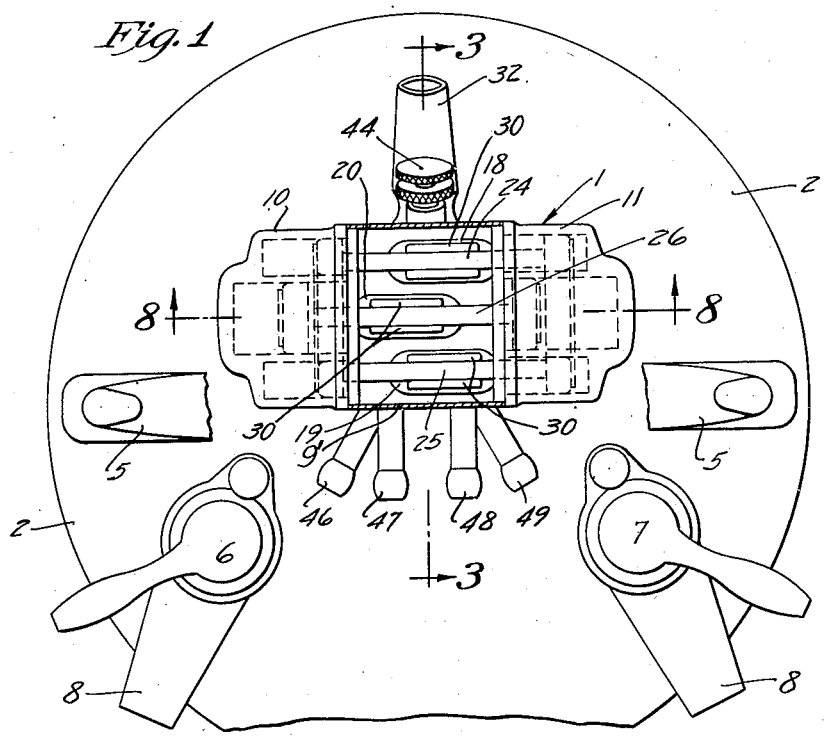
Fig. 1 is a top plan view, with some parts broken away and some parts shown in section, of a milk pail of the type commonly used in connection with milking machines, and having mounted on its cover a pulsator mechanism made in accordance with the instant invention.
Figure 2:
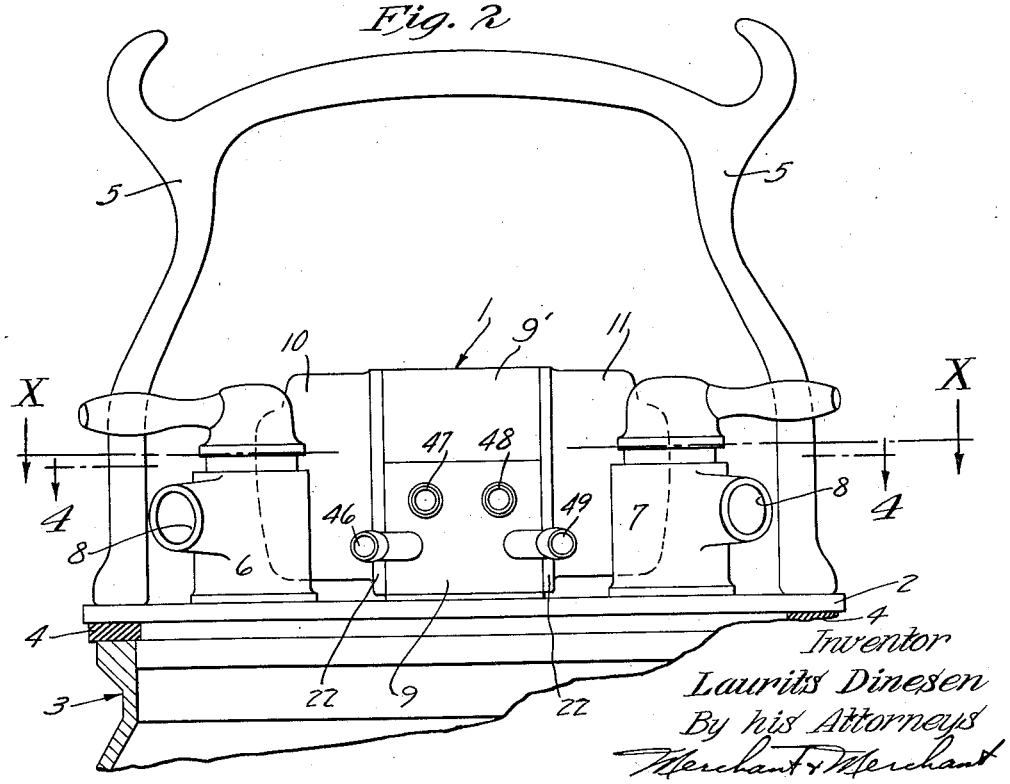
Fig. 2 is a fragmentary view in side elevation, with some parts shown in section and some parts broken away, of the pulsator-equipped milk pail of Fig. 1, looking from bottom toward top with respect to Fig. 1.

In the particular embodiment chosen to illustrate the invention, the novel pulsator mechanism, indicated as an entirety by 1, is mounted on the cover 2 of a milk pail 3 of the variety commonly used in connection with milking machines. The milk pail 3 is maintained under partial vacuum, through connections and in a manner hereinafter described, and the cover 2 thereof is seated on the open top of the pail through the medium of an interposed resilient gasket or sealing ring 4 of rubber, synthetic rubber, or other suitable material. In accordance with conventional practice, the pail cover 2 is provided with a yoke-like carrying handle 5 and valves 6 and 7 that open downwardly through the cover 2 and are provided with outwardly-extending hose coupling nipples 8 that are adapted to be connected to the inner or milk-receiving chambers of the teat cups, not shown, of the milking machine, through suitable flexible hoses, not shown. These valves 6 and 7 are of the conventional manually-operated type which may be operated to regulate the milk flow to the pail.

The pulsator mechanism illustrated comprises, mainly: a main body in the nature of a block 9, a pair of opposed outer cylinders 10 and 11, respectively, an opposed pair of inner cylinders 12 and 13, respectively, a cooperating pair of annular pistons 14 and 15, one working within the annular space between cylinders 10 and 12, and the other working within the annular space between cylinders 11 and 13, an opposed pair of inner pistons 16 and 17, respectively, the former working within cylinder 12 and the latter working within cylinder 13, slide valves 18 and 19 operated by the annular pair of outer pistons 14 and 15, and slide valve 20 operated by the inner pair of pistons 16 and 17. The mounting block or body 9, in the present example, is mounted directly upon the intermediate portion of the pail cover 2 through the medium of suitable anchoring devices, such as are shown at 21 in Fig. 3. The opposed cylinders 10 and 11 are detachably anchored to opposite flat faces of body 9 by means of integrally-formed anchoring flanges 22 (see Fig. 5) and anchoring screws or the like 23. By reference to the drawings, and particularly to Figs. 3 and 5 thereof, it will be seen that the axes of the opposed cooperating cylinders 10 and 11 are approximately aligned with the flat upper face of body 9 so that the upper halves of outer cylinders 10 and 11, and inner cylinders 12 and 13, extend above the plane of the top of the body 9. Also, by reference to the drawings, it will be seen that the outer pair of annular pistons 14 and 15 are rigidly connected by a laterally-spaced pair of connecting rods 24 and 25, and that the cooperating pair of inner pistons 16 and 17 are connected by a single connecting rod 26, the said connecting rods 24, 25, and 26 being preferably, and as shown, formed integrally with their respective cooperating pistons, and all extending over and in spaced relation to the flat upper surface of body 9. The annular outer pair of pistons 14 and 15 are preferably, and as shown, equipped with sealing devices in the nature of annular sealing cups 27 of leather, rubber, synthetic rubber, or the like, and which makes sealing contact with the interiors of cylinders 10 and 11, and the exteriors of cylinders 12 and 13. The inner pistons 16 and 17 are provided with conventional resilient sealing devices 28, shown as being in the nature of conventional sealing cups, which may be formed of leather, rubber, synthetic rubber, or the like.

The outer ends of outer cylinders 10 and 11 are closed, and are bored to receive the outer end portions of cylinders 12 and 13 that are pressed fit into the said bores of the heads of cylinders 10 and 12. In this way, the outer ends of inner cylinders 12 and 13 are also closed by the ends or heads of cylinders 10 and 11, respectively; and the inner cylinder 12 and 13 are firmly anchored in positions concentric with the axis of cylinders 10 and 11.

The oscillatory slide valves 18, 19 and 20 all have flat bottom surfaces that work over and make sealing engagement with the flat upper surface of body 9, and these valves 18, 19 and 20 are respectively formed to provide downwardly opening elongated valve cavities 18′, 19′ and 20′. The longitudinally intermediate portions of piston connecting rods 24, 25 and 26 extend over the laterally intermediate portions of valves 18, 19 and 20, respectively, which are respectively reciprocated with said connecting rods. In this respect, attention is directed, first, to Figs. 8, 9 and 10 wherein it will be seen that the connecting rods 24, 25 and 26 are provided with valve-receiving notches 29, the ends of which respectively overhang the ends of valves 18, 19 and 20 to impart reciprocation to said valves. In order to guide the valves 18, 19 and 20 for straight-line reciprocating movements with their respective cooperating connecting rods 24, 25 and 26, the said valves are provided with laterally-spaced upstanding flanges 30 that embrace opposite sides of their respective cooperating connecting rods 24, 25 and 26 (see Fig. 3). As will hereinafter be seen, the valves 18, 19 and 20 are held to their seats by atmospheric pressure from above.

The interior of the body 9 is bored out to afford a pressure chamber 31 wherein there is maintained a pressure differing from atmospheric pressure, and which, in accordance with the present example, is a sub-atmospheric pressure or partial vacuum. This pressure chamber 31 is adapted to be connected to a suitable source of partial vacuum, such as a vacuum pump, not shown, through suitable hose connections, not shown, and a hose coupling nipple 32. Low pressure chamber 31 is in constant communication with the interior of the milking pail 3 through a pail cover aperture 33, and a suitable moisture trap 34, shown best in Fig. 3.

The valve seat for slide valve 18 (that portion of the flat top surface of body 9 traversed by valve 18) is intercepted by a downwardly-directed port 35 and oppositely-spaced end ports 36 and 37. The valve seat for slide valve 19 (that portion of the flat top of body 9 traversed by valve 19) is intercepted by a downwardly-directed port 38, and oppositely-spaced valve ports 39 and 40, respectively. The valve seat for slide valve 20 is intercepted by a downwardly-directed port 41, and oppositely-spaced end ports 42 and 43, respectively. As best shown in Fig. 3, the intermediate ports 35, 38 and 41 all communicate with the interior of the milk pail 3 through the low pressure chamber 31, the interior of the moisture trap 34, and orifice 33 of the pail cover. For the purpose of regulating the speed of operation of the pulsator mechanism, a needle valve 44 (see particularly Fig. 3) is provided for variably restricting the port 35. The end port 36 for valve 18 is connected to the interior of the outer end portion of cylinder 13 and comprises registering passages in the body 9, the lower portion of cylinder 11, and through the cylinder 13 (see particularly Figs. 4 to 7, inclusive, and 11 to 14, inclusive). The valve port 37 of slide valve 18 is connected to the interior of the outer end portion of the inner cylinder 12 and comprises registering passages in body 9, the wall of cylinder 10, and a passage through the wall of cylinder 12. The port 42 of slide valve 20 comprises registering passages in the body 9 and wall of cylinder 10 and opens into the outer interior portion of outer cylinder 10 (see particularly Figs. 4, 8 and 12). The valve port 43 of slide valve 20 comprises registering passages in body 9 and the wall of cylinder 11 and opens into the outer interior portion of outer cylinder 11 (see particularly Figs. 4, 8, and 11 to 14, inclusive). The end port 39 of slide valve 19 is formed wholly within the body 9 and opens into or communicates with a pair of hose coupling nipples 46 and 47 that are adapted to be coupled each to the outer chamber (the space between the flexible inflation and outer sheet) of a different teat cup of the milking machine. The valve port 40 of slide valve 19 is similarly formed wholly within the body 9 and communicates with a pair of hose coupling nipples 48 and 49, each also adapted for connection to the outer chamber of a different teat cup of the milking machine. The cavities 18′, 19′ and 20′ of the valves 18, 19 and 20, respectively, are of such length to span and connect the center and one cooperating end port at a time, while leaving the other or opposite cooperating end port exposed to atmosphere.

With the arrangement described, it will be seen that speed of reciprocation of the cooperating pairs of pistons and their respective valves is controlled by manual adjustment of the needle valve 44, and that the valve 18, operating in conjunction with its cooperating ports 35, 36 and 37, controls the speed of reciprocation of the inner pair of pistons 16 and 17, and that valve 20 controls and times the annular outer set of pistons 14 and 15, and that valve 19, which is reciprocated in common with the valve 18 under the action of pistons 14 and 15, alternately connects the pairs of teat cup hose nipples 46—47 and 48—49, respectively, to atmospheric pressure and partial vacuum of the milk pail, one pair being connected to atmosphere, while the other pair is connected to sub-atmospheric pressure of the milk pail. In this last respect, it is important to note that in the present improved and very compact arrangement, the valve mechanism governing the milking function (meaning valve 19) is entirely independent of the valves 18 and 20 controlling operation of the pulsator mechanism itself.

In the commercial device illustrated, the valve mechanism is normally enclosed by a removable, elongated, semi-cylindrical cover member 9' mounted on the body 9 and extending between the cylinders 10 and 11.

Operation

If we assume now that the apparatus is connected for operation in the usual manner with the nipple 32 connected to a source of partial vacuum, such as a vacuum pump, the mechanism will operate as follows: Starting with the parts positioned as in Fig. 11, it will be seen that the outer ends of cylinders 10 and 13 are then connected to the partial vacuum condition of the chamber 31 and milk pail, the former through port 42, valve cavity 18', port 35, low-pressure chamber 31, moisture trap 34 and pail cover aperture 33, and the latter through port 36, valve cavity 20', port 41, low-pressure chamber 31, moisture trap 34 and pail cover aperture 33, whereas the outer ends of cylinders 12 and 11 are subject to atmospheric pressure through now open ports 37 and 43, respectively. Under these conditions, the connected pair of pistons 14 and 15 will tend to remain in their extreme positions of Fig. 11, whereas the connected pair of pistons 16 and 17 and valve 20 carried thereby will be motivated from their extreme positions of Fig. 11, to their opposite extreme positions of Fig. 12. As a result of this left-to-right movement of pistons 16 and 17 and valve 20, the valve port 42 to the outer end of cylinder 10 will be exposed to atmosphere, and the valve port 43 to the outer end of cylinder 11 will be subject to the vacuum condition of the milk pail through passages comprising the cavity 20' of valve 20 and port 41. Under these conditions, the connected pair of pistons 14 and 15 and their cooperating valve 18 will be motivated from their extreme left-hand positions of Fig. 12 to their extreme right-hand positions of Fig. 13, while the connected pair of pistons 16 and 17 and the cooperating valve 20 will remain in their extreme right-hand positions common to Figs. 12 and 13. With the pistons and cooperating valves positioned as in Fig. 13, the valve ports 36 and 42 will be subject to atmosphere, thereby subjecting the outer ends of cylinders 10 and 13 to atmospheric pressure, whereas the outer ends of cylinders 12 and 11 will be subject to the partial vacuum or sub-atmospheric condition of the milk pail, the former through port 37, valve cavity 18', port 35, low-pressure chamber 31, moisture trap 34 and pail cover port 33, and the latter through port 43, valve cavity 20', port 41, low-pressure chamber 31, trap 34 and port 33. Under these conditions, the connected pistons 14 and 15 will tend to remain in their extreme right-hand positions common to Figs. 13 and 14, whereas the connected pair of pistons 16 and 17 will be motivated from their extreme right-hand positions of Figs. 12 and 13 to their extreme left-hand positions of Figs. 11 and 14, and which will place the mechanism in condition to be returned from the position of Fig. 14 to the position of Fig. 11 to complete an entire cycle of operation. Now, of course, it will be appreciated that the slide valve 19 will be reciprocated back and forth with pistons 14 and 15, thereby connecting the pair of nipples 46 and 47 to the sub-atmospheric pressure condition of the milk pail and the nipples 48 and 49 to atmospheric pressure when the valve 19 is positioned as in Figs. 11 and 12, and connecting nipples 48 and 49 to sub-atmospheric pressure and nipples 46 and 47 to atmosphere when valve 19 is positioned as in Figs. 13 and 14. This operation of valve 19 is, of course, the work function for which the machine described was designed.

Preferably, the inner cylinders 12 and 13 are in the nature of short lengths of drawn seamless tubing press fit into the cooperating recesses of the closed ends or heads of the outer cylinders 10 and 11.

What I claim is:

1. In a fluid pressure operated device of the kind described, concentric inner and outer cylinder means, a connected pair of pistons mounted for reciprocating movements in the inner cylinder means, an annular pair of connected pistons mounted for reciprocating movements between the inner and outer cylinder means, and two valve mechanisms each operatively connected with one pair of connected pistons and each controlling operation of the other pair of connected pistons.

2. In a fluid pressure operated device of the kind described, an axially-spaced pair of outer cylinders, an axially-spaced pair of inner cylinders each concentrically mounted in an opposite one of said outer cylinders thereby providing an annular space between each outer cylinder and its contained inner cylinder, a rigidly connected pair of pistons working each in an opposite of said pair of outer cylinders, a rigidly connected pair of pistons working each in an opposite of said pair of inner cylinders, and two valve mechanisms each operatively connected with one pair of connected pistons and each controlling operation of the other said pair of connected pistons.

3. The structure defined in claim 1 in further combination with a third valve mechanism also operatively connected with one of said pairs of connected pistons.

4. The structure defined in claim 2 in further combination with a third valve mechanism also operatively connected with the said pair of annular outer pistons.

5. In a fluid pressure operated device of the kind described, an axially-spaced pair of outer cylinders having closed outer ends, an axially-spaced pair of inner cylinders concentrically arranged each in an opposite of said outer cylinders and radially spaced therefrom to provide an annular space between each outer cylinder and its contained inner cylinder, the said inner cylinders being mounted on and projecting inwardly from the closed outer ends of the outer cylinders, connected fluid pressure operated pistons working in the inner cylinders, connected annular fluid pressure operated pistons working in the annular spaces within the outer cylinders, and two valve mechanism each operatively connected with one pair of connected pistons and each controlling operation of the other pair of connected pistons.

6. The structure defined in claim 5 in further combination with another valve mechanism operatively connected with the said pair of outer annular pistons.

7. The structure defined in claim 5 in which the said inner cylinders are in the nature of tubes set in recesses in the closed outer ends of the outer cylinders.

8. In a fluid pressure operated device of the kind described, an axially-spaced axially-aligned pair of outer cylinders, an axially-spaced pair of inner cylinders each concentrically mounted in an opposite one of said outer cylinders to provide an annular space between each outer cylinder and its cooperating inner cylinder, a cooperating pair of pistons working each in an opposite of said inner cylinders, a cooperating pair of annular pistons working each in the said annular space within an opposite of said outer cylinders, a rigid connecting rod extending between and connecting the inner pistons, a laterally-spaced pair of rigid connecting rods extending between opposite annular pistons and located on opposite sides of the connecting rod of the inner pistons, valve mechanism located between the inner cylinders and controlling operation of the annular outer pistons and being operatively connected to the connecting rod of the inner pistons, valve mechanism located between the outer cylinders and controlling operation of the inner pistons and operated by one of the said connecting rods of the annular outer pistons, and another valve mechanism also located between the outer cylinders and operated from the other connecting rod of the outer annular pistons.

9. The structure defined in claim 8 in which the several valve mechanisms each comprise a slide valve element underlying and operatively coupled to and for reciprocating movements with a different one of said connecting rods.

LAURITS DINESEN.

REFERENCES CITED

The following references are of record in the file of this patent:

UNITED STATES PATENTS

| Number | Name | Date |
|---|---|---|
| 1,376,804 | Fosler | May 3, 1921 |
| 2,253,341 | Michaels | Aug. 19, 1941 |
| 2,273,679 | Westberg | Feb. 17, 1942 |
| 2,419,844 | McArthur et al. | Apr. 29, 1947 |